United States Patent Office 3,003,187
Patented Oct. 10, 1961

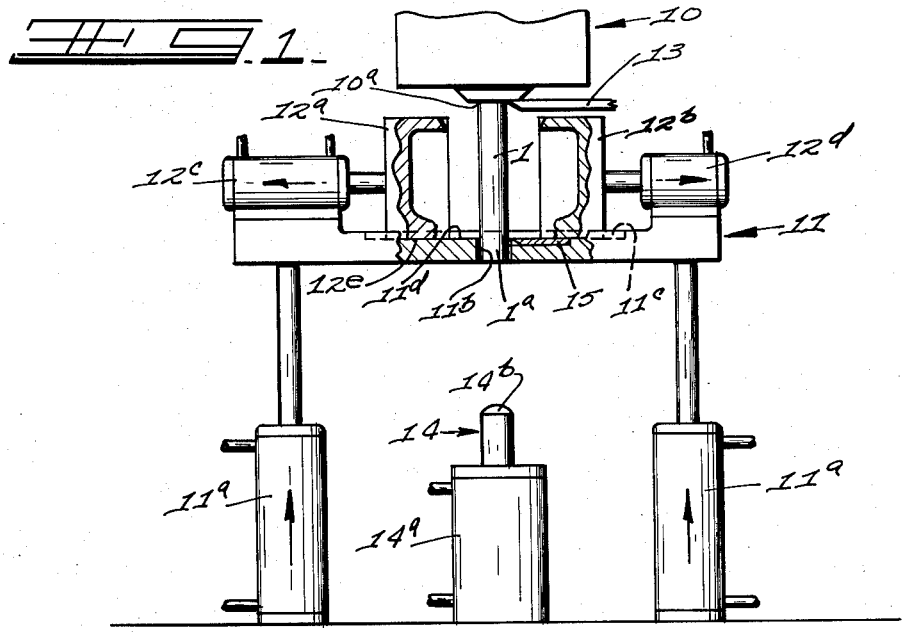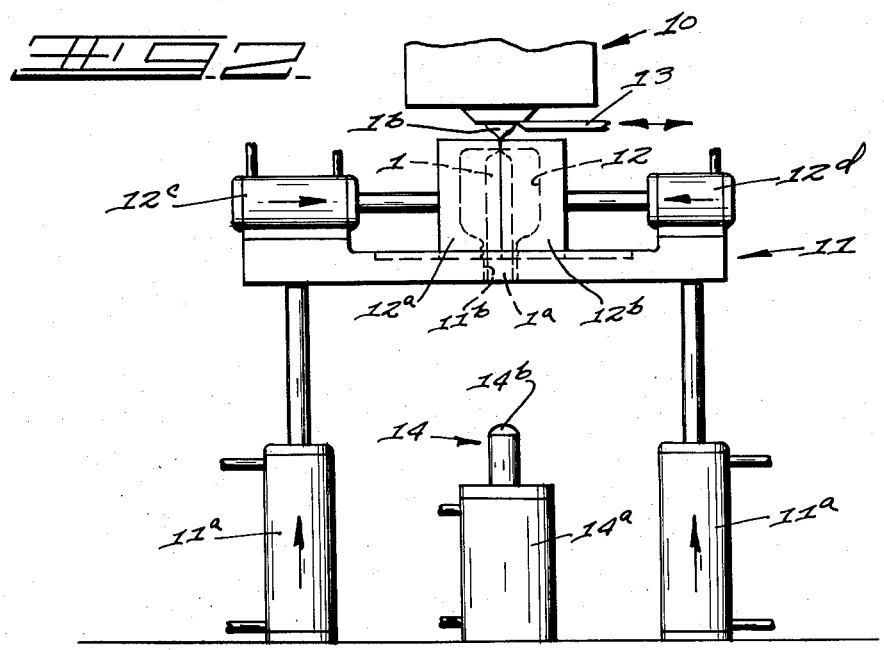

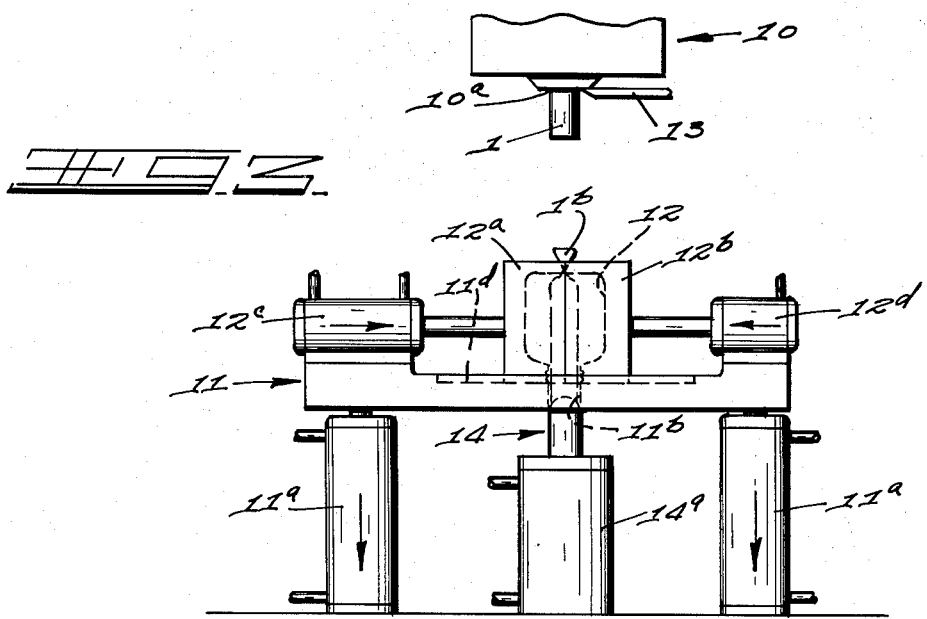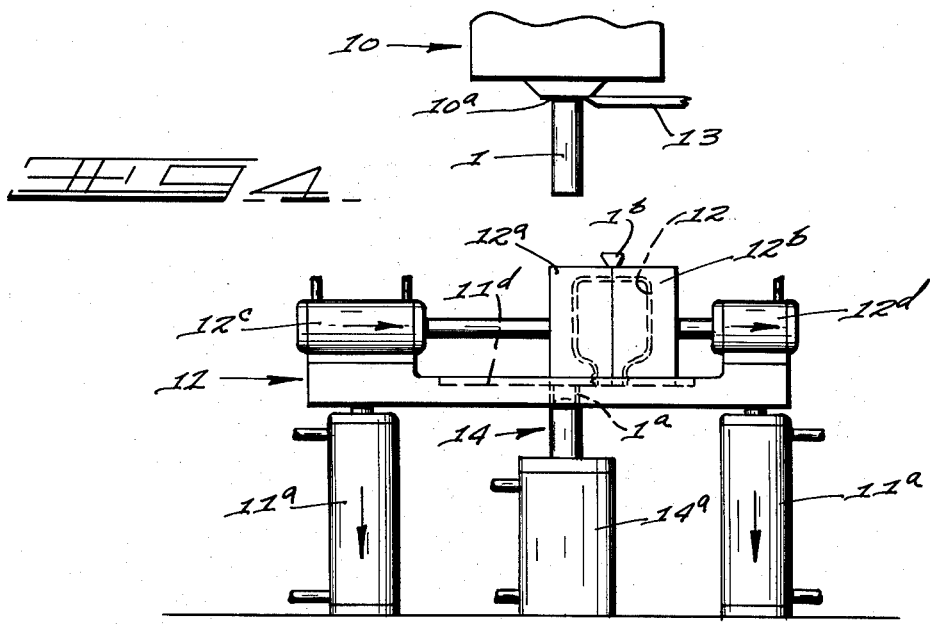

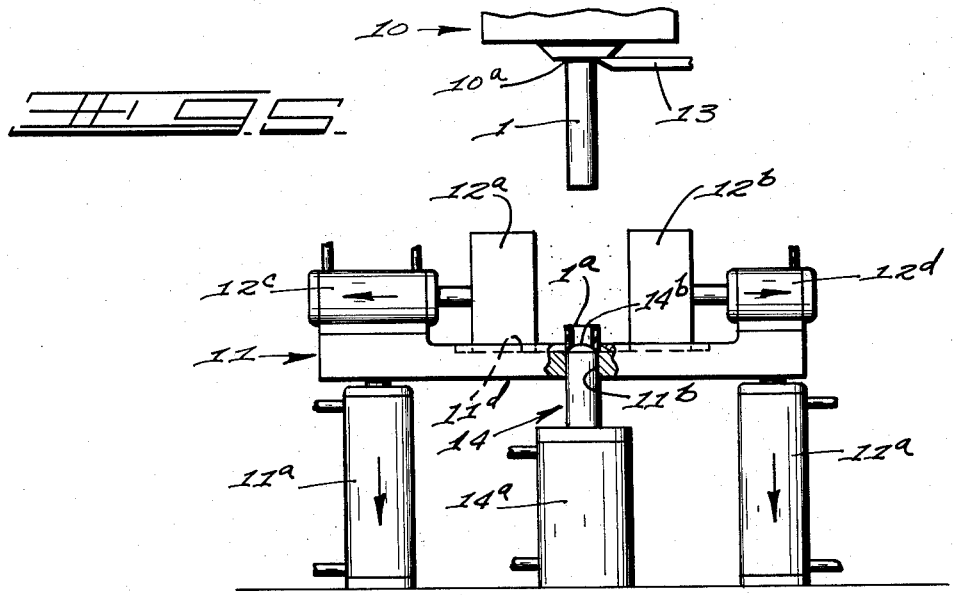
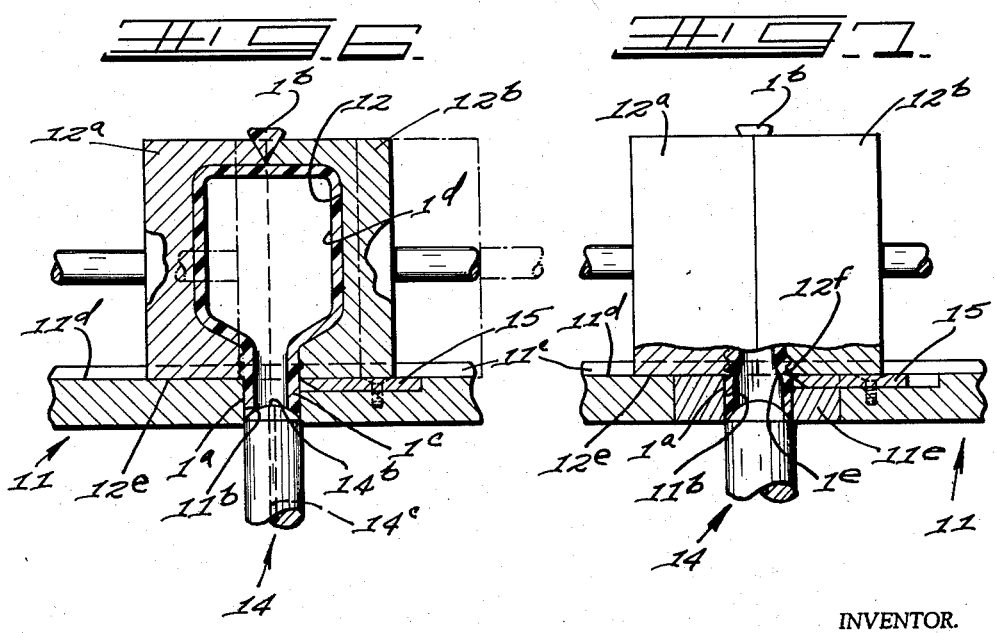

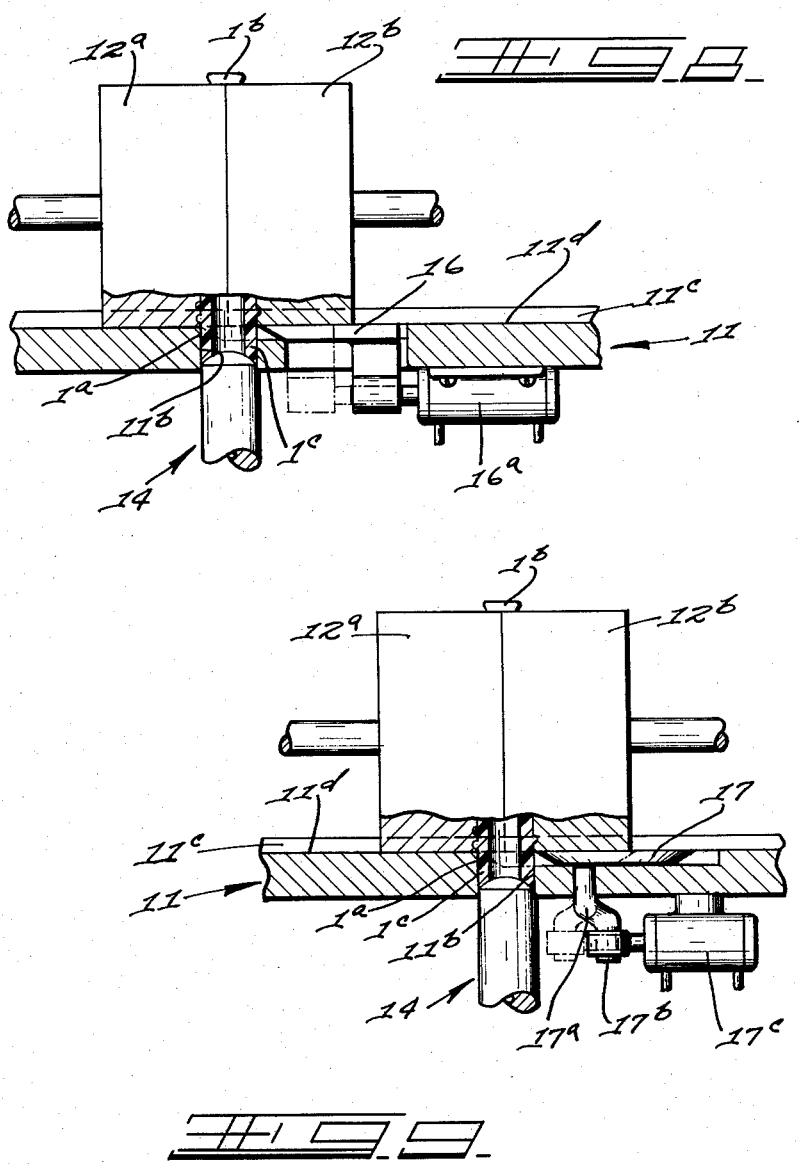

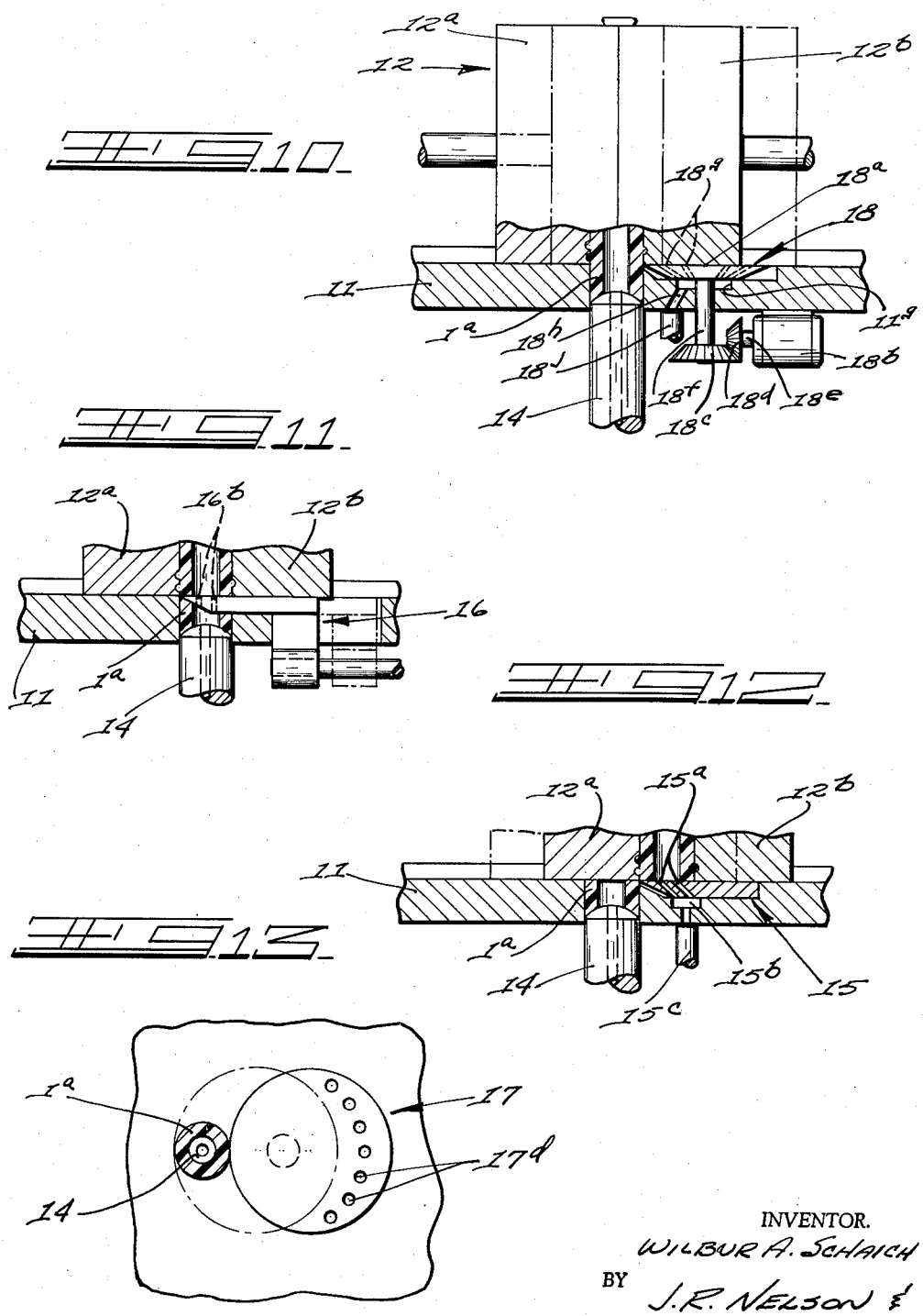

3,003,187
METHOD AND APPARATUS FOR FORMING AND TRIMMING HOLLOW PLASTIC ARTICLES
Wilbur A. Schaich, Maumee, Ohio, assignor to Owens-Illinois Glass Company, a corporation of Ohio
Filed Oct. 16, 1958, Ser. No. 768,526
16 Claims. (Cl. 18—5)

This invention relates to an improved method and apparatus for the formation of hollow plastic articles and constitutes a continuation-in-part of my parent U.S. application, Serial No. 756,576, filed August 22, 1958, now abandoned.

The formation of hollow plastic articles, such as toys, dolls, bottles or the like, by expansion of a tubular formation of plastic within a partible mold has long been practiced. It has likewise been common practice to form the tubular formation by extrusion of the plastic from an annular orifice at a temperature permitting the tubular formation to be immediately expanded within an enclosed blow mold. In all of the known processes and apparatus wherein the complete plastic article is formed by blowing or expansion of tubing within a mold, it has been necessary to subject the formed article, after release from the mold, to a subsequent additional trimming or severing step in order to cut off the surplus plastic material. This has been an outstanding objection to the utilization of such blowing processes for the formation of plastic bottles, in that the neck or finish portion of the bottles should preferably have no flash or parting lines extending across the sides or end face of the bottle neck, for the presence of such flash or parting lines will adversely affect the sealability of the bottle when a conventional closure is applied thereto. Likewise, in all known processes it has been necessary to subject at least a portion of the tubing being blown to extraneous cooling influences or chilling contacts prior to expansion of the tubing to the mold walls. For example, in United States Patent No. 2,810,934 issued to Bailey, the tube is extruded about a mandrel prior to being blown. Such extraneous chilling contacts invariably result in nonuniform distribution of the plastic in the wall of the blown article produced.

Accordingly, it is an object of this invention to provide an improved method and apparatus for forming hollow plastic articles by expansion of a plastic tubular formation, such method and apparatus being characterized by the fact that the trimming of the surplus plastic is automatically accomplished prior to the release of the formed plastic article from the blow mold.

Still another object of this invention is to provide a unique method of operation of a plastic blowing machine of the type wherein sections of a partible blow mold are laterally movable with respect to the extruding axis of a plastic tube extruder so that the lateral movement of the blow mold sections may be utilized to effect a trimming of surplus plastic from the blown article formed within such mold prior to release of the article from the mold.

Still another object of this invention is to provide an improved method and apparatus for effecting the positioning of a hot tubular formation of plastic within a blow mold and achieving the application of blowing pressure to such formation without the necessity of extruding the formation about a mandrel or otherwise contacting the blowable portions of the tubular formation with any chill producing element prior to enclosure of such formation within the blow mold.

The specific nature of this invention, as well as other objects and advantages thereof, will become apparent to those skilled in the art from the following detailed description, taken in conjunction with the annexed sheets of drawings on which, by way of preferred example only, are illustrated several embodiments of this invention.

FIG. 1 is a schematic side elevational view of one form of apparatus suitable for carrying out the method of this invention, showing the elements of the apparatus in their respective positions corresponding to the initiation of the plastic blowing process.

FIG. 2 is a view similar to FIG. 1, but illustrating the step of closing of the partible mold sections about the extruded length of tubing and severing of the extruded tube.

FIG. 3 is a view similar to FIG. 1, but illustrating the step of moving the closed partible mold carrying the severed length of tubing to a remote position with respect to the extruder orifice and to engage the blowhead.

FIG. 4 is a view similar to FIG. 1, but illustrating the step of severing the excess length of tubing depending from the closed partible mold by lateral movement of the closed partible molds.

FIG. 5 is a view similar to FIG. 1, with a portion thereof in section, but illustrating the ejection of the severed excess end portion of the plastic tube from the machine following the opening of the closed partible mold and the ejection of the finished plastic article.

FIG. 6 is a partial vertical sectional view of FIG. 3, but illustrating the blowing of the tubular formation to conform to the partible mold cavity.

FIG. 7 is a view similar to FIG. 6, but illustrating a modified apparatus for producing a thin web at the severing plane.

FIG. 8 is a view similar to FIG. 6, but illustrating another embodiment of this invention for effecting the severing of the excess plastic tube projecting from the bottom of the closed partible mold, the severing being accomplished by a laterally shiftable knife element.

FIG. 9 is a view similar to FIG. 6, but illustrating still another embodiment of this invention for effecting the severing of the excess plastic tube projecting from the bottom of the closed partible mold, the severing being accomplished by a rotatable cutting element.

FIG. 10 is a view similar to FIGS. 7–9, but illustrating still another embodiment of this invention for severing residual excess plastic from the formed article.

FIG. 11 is a view similar to FIG. 8, but illustrating a modification of the severing device shown therein.

FIG. 12 is a view similar to FIGS. 6 and 7, but showing a modification of the cutting device shown therein.

FIG. 13 is a view similar to FIG. 9, but illustrating a modification of the cutting device shown therein.

In all embodiments of this invention, the following sequence of steps is accomplished to produce a desired blown plastic article. Any conventional plastic extruder may be utilized, having a downwardly directed annular orifice capable of issuing a freely pendant, hollow tubular formation of plastic material from such orifice at a temperature permitting subsequent expansion and setting of the issued tubular formation in a mold. Preferably, the distal or issuing end of the tubular formation is open, although this is not an essential requirement. After a sufficient length of tubing has been issued from the annular orifice to provide sufficient material that same may be blown into the desired plastic article, a limited axial end portion of the issued tubing is subjected to a lateral restraint in order to position the issued tubular formation, which heretofore has been freely pendant from the annular orifice, so that the sections of a partible mold may be enclosed around the tubing. Preferably, such lateral restraint may be imposed by causing the free end of the pendant tubing to enter an oversized aperture defined in a rigid element which will hereafter be referred to as a "mold bed." The partible mold sections are then closed about the issued length of tubing, and, in the case of formation of a plastic container having a neck opening, the cavity of the partible mold sections, when closed, defines the container in an inverted position so that the bottom face of the closed partible mold lies in the same plane as the desired end face or rim of the neck of the container. The bottom end faces of the partible mold sections, when closed, are also contiguous to a top surface of the mold bed. The top portions of the partible mold sections are so shaped as to effect a pinching and sealing of the plastic tubing when shifted to their closed position about the tubing.

Substantially concurrently with the closing of the partible mold sections, or immediately thereafter, the tubing is severed at a point intermediate the closed partible mold and the orifice of the extruder. If desired, such severing can be accomplished by knife-like elements incorporated in the top portions of the partible mold sections which wipe across the extruder orifice. In such case, it is essential that the closed partible mold sections be moved downwardly away from the extruder orifice concurrently with, or immediately following, the severing step. Alternatively, and as illustrated in the drawings, the severing may be accomplished by a separate knife or shear element. With either severing procedure, concurrently with, or immediately following the severing step, the closed partible mold sections containing the severed length of tubing should be moved axially away from the annular extruder orifice at a rate exceeding the advancing rate of the additional tubing issuing from the extruder orifice. In this manner, the extruder may be operated continuously, and thus achieve recognized economies in production, efficiency, and a better quality, more uniform extrusion of tubing.

Thus, the closed partible mold and mold bed are moved downwardly to a position which will hereafter be referred to as the blowing position. Concurrently with such downward movement, or immediately after the completion of such movement, a blow head is shifted upwardly in the aforementioned aperture in the mold bed, and brought into contact with the free end of the tubing disposed therein. If, as is preferable, the free end of the tubing is open, the blow head preferably is provided with a conical or spherical top surface which enters axially into and expands the open end of the tubing into engagement with the walls of the aperture to thereby achieve a seal between the tubing and the blow head. If the free end of the tubing is closed, the blow head must necessarily incorporate a hypodermic needle or similar puncturing element with which to penetrate the closed end and introduce fluid pressure within the severed length of tubing sufficient to expand the tubing to the configuration of the closed partible mold. With either procedure, sufficient fluid pressure is applied to the interior of the severed length of tubing to effect its expansion to conform to the walls of the closed partible mold. Obviously, the expansion of the tubing in the mold cavity may be accomplished or assisted by applying vacuum to the interior of the mold cavity.

It will be noted from the foregoing description that the entire plastic article is formed by blowing, and, more importantly, all portions of the plastic tubing which are expanded by blowing have been free from any extraneous chilling influences or contacts prior to being expanded into contact with the walls of the closed partible mold. The only portion of the tubing which has been subjected to a chilling contact is that limited axial end portion which has entered the aperture in the mold bed, but, as will be further discussed, this portion does not form any part of the finished plastic article. Further cooling or chilling of the limited axial end portion of the plastic tubing and/or walls of the aperture may be accomplished by providing cooling passages (not illustrated) in the region of the mold bed closely adjacent to the plastic tubing in order to avoid the tendency of the plastic to possibly adhere to the walls of the aperture and to insure an easier subsequent removal of the surplus plastic from the aperture.

During the last portion of the aforedescribed blowing step, or immediately subsequent to the completion of such blowing step, that portion of the initial tubing length which projects downwardly out of the closed partible mold sections is then severed by a cutting action exerted in the plane of the bottom face of the closed partible mold, or, for convenient reference, since such bottom faces are in close contact with the mold bed, by a cutting action in the plane of the mold bed. In accordance with one embodiment of this invention, wherein the partible mold sections are laterally shiftable with respect to the mold bed, such cutting action may be most conveniently accomplished by positioning a cutting knife in the plane of the mold bed and immediately adjacent to the mold bed aperture, and then moving the mold sections, while still closed and containing the blown plastic article, laterally across the knife edge to achieve the severing of the surplus plastic.

Alternatively, a cutting element lying in the plane of the mold bed may be moved laterally, with respect to both the partible mold and the mold bed, across the aperture to sever such plastic material, or a rotary cutting element, again lying in the plane of the mold bed, may be rotated across the mold bed aperture to effect such cutting action. Still further, a rotary cutting element may be rotated in the plane of the mold bed and relative lateral movement imparted to the partible mold and mold bed to achieve a severing of the surplus or residual plastic material remaining on the neck portion of the formed article. Any plastic tail projecting above the mold may be similarly removed. In all cases, the severing of the surplus material depending from the bottom end of the closed partible mold or projecting from the top thereof is accomplished while the partible mold sections are closed, and, hence, while the formed plastic article is completely confined and supported by the closed partible mold.

The mold sections are then opened, and the formed article is ejected from the mold sections in any conventional fashion, such as by a laterally directed air blast, and the molds are shifted to their initial position with respect to the extruder orifice. Concurrently, the blow head is elevated in the mold bed aperture to eject the severed surplus plastic from such aperture, and this excess plastic material may likewise be ejected from the machine by a laterally directed air blast. Upon return of the mold bed and the partible mold sections to their initial positions with respect to the extruder orifice, the forming process is then repeated, it being remembered that in the meantime, the extruder has produced another length of tubing suitable for formation of the desired plastic article, and the free end of such tubing immediately enters the mold bed aperture, and the molds are closed therearound so that the next cycle is initiated without any substantial time lag.

Referring to the drawings, there will now be described a form of apparatus capable of carrying out the aforedescribed steps of the process embodying this invention. Such apparatus includes a conventional extruder 10 having a downwardly directed annular orifice 10a capable of issuing therefrom in freely pendant relationship, a hollow tubular formation of plastic material, which is at a suitable temperature to permit subsequent expansion and setting in a mold. Suitable temperature controls or orifice adjustments (not shown) are incorporated in the extruder 10 in conventional fashion to insure that the extruder plastic tubular formation 1 will lie substantially in alignment with the vertical axis of the extruder orifice 10a.

A mold bed is provided which is capable of vertical movements relative to the extruder orifice. Preferably, mold bed 11 comprises a horizontal plate-like element 11 which is supported by a pair of vertically disposed fluid pressure cylinders 11a which effect upward and downward movements of the mold bed 11, as required, to comply with the aforedescribed process. In the central portion of mold bed 11, a vertical aperture 11b is provided which is of sufficiently greater size than the issued tubular plastic formation, designated as 1, to permit the free end of the tubular formation to freely enter such aperture when a desired length of the tubular formation has issued from extruder 10. In this manner, a lateral restraint may be imposed upon a limited axial end portion of the free or distal end of the issued tubular formation 1, such limited axial end portion being hereafter referred to as 1a.

A plurality of partible mold sections 12a and 12b are provided which, when closed, define a molding cavity 12 corresponding to the configuration of the plastic article desired. The mold sections 12a and 12b are laterally shiftable with respect to the mold bed 11, and may, if desired, be directly mounted on mold bed 11 for horizontal sliding movement with respect to the mold bed 11. For example, each mold section 12a and 12b may slide in a groove 11c formed in the top surface of mold bed 11 to guide the lateral movements of the mold sections with respect to the mold bed. A pair of fluid actuated cylinders 12c and 12d are respectively provided for the mold sections 12a and 12b and control the lateral shifting movements of such mold sections relative to the mold bed 11.

When it is desired to form a hollow plastic container having a neck opening, such as the bottle configuration illustrated by mold cavity 12 (FIG. 2), the mold sections 12a and 12b cooperate to define the mold cavity 12 which has a configuration corresponding to the external shape of the desired container although in an inverted relationship so that the end face of the neck of the desired container will be disposed in the same plane as the bottom face 12e of the mold sections 12a and 12b. The mold sections 12a and 12b are closed about the issued length of tubing 1 with their bottom face 12e disposed in tight contiguous engagement with a top surface 11d of the mold bed 11.

Concurrently with the closing of the mold sections 12a and 12b, as illustrated in FIG. 2, the top confronting edges of such mold sections achieve a pinching and sealing action on the top end of the plastic tubular formation enclosed in such mold, such as indicated at 1b. While not essential to this invention, it is desirable that the neck opening of the molding cavity exceed the diameter of the plastic tubing. In this manner, no axial flash will be produced along the neck of the container when the mold sections close.

Concurrently with the closing of the mold sections 12a and 12b, or immediately subsequent thereto, the issued length of plastic tubing is severed from the extruder. As illustrated in the drawings, such severing may be accomplished by a laterally shiftable knife element 13 which is mounted immediately below the extruder orifice 10a, and which is actuated by a suitable fluid cylinder (not shown) to effect the desired severing action. Preferably, the severing accomplished by the knife 13 is done in such a rapid fashion as to leave the oncoming end of the plastic tubing open for convenience in carrying out repetitive operations such as those embodying the present invention.

Concurrently with the severing action of the knife 13, or immediately subsequent thereto, the mold bed 11 and the closed partible mold sections 12a and 12b are moved downwardly relative to the extruder orifice 10a at a greater speed than the extrusion rate so as to space apart the severed ends of the plastic tubing and permit the extruder 10 to operate continuously and continue to extrude the next length of plastic tubing while the blowing of the severed length is being accomplished in the downward position of the partible mold sections 12a and 12b.

A blow head 14 is provided in axial sliding relationship in the mold bed aperture 11b. A fluid cylinder 14a controls the vertical movements of blow head 14 as required by the process. Preferably, blow head 14 is provided with a conical or spherical top surface 14b which engages the open end 1a of the plastic tubular formation and achieves a seal therewith. Blow head 14 is shifted into engagement with the plastic tubular formation immediately upon the initiation of the downward movement of the mold bed 11, or upon the arrival of the mold bed 11 at its lowermost blowing position, and fluid pressure is applied through a suitable axial passage 14c (FIG. 6) in blow head 14 to expand the severed tubular formation of plastic to the configuration of the mold cavity 12. The same fluid pressure will force the limited axial end portion 1a of the plastic tubular formation outwardly into snug-engagement with the walls of mold bed aperture 11b, and, hence, the maintenance of a fluid pressure seal between the blow head 14 and the interior of the plastic tubing 1 is assured.

Fluid pressure is maintained by blow head 14 for a sufficient length of time to insure the expansion of the plastic to conform to the molding cavity 12. Near the end of the desired blowing period, which, as is conventional, includes substantially more time for the plastic to cool to self-supporting configuration than to effect the actual expansion of the plastic, that portion 1a of the original plastic tube projecting out of the molding cavity 12 and into the mold bed aperture 11b is severed by a cutting action in the plane of the bottom face of the partible mold sections 12a and 12b, or, for convenience of reference, in the plane of the mold bed 11.

In accordance with the embodiment of this invention illustrated in FIG. 4, a cutting knife 15 is mounted in a suitable recess in the mold bed 11 so that its cutting edge is disposed in the plane of the mold bed surface 11d and lies immediately adjacent to the mold bed aperture 11b. The width of knife 15 is at least equal to aperture 11b. The fluid cylinders 12c and 12d respectively controlling the lateral position of mold sections 12a and 12b, are then actuated to concurrently shift the partible mold sections 12a and 12b, while still closed, laterally with respect to the knife 15, so as to achieve the severing of the surplus plastic 1a from the blown plastic article now indicated as 1d (FIG. 6). Since the blown plastic article 1d is completely supported by the mold sections 12a and 12b during the severing operation (see FIG. 4), it is apparent that the severing can be accomplished during the time allotted for cooling of the plastic article within the mold, and, hence, no additional cycle time need be required to accomplish the severing step.

Alternatively, as illustrated in FIG. 8, the severing of the surplus plastic 1a may be accomplished by a laterally shiftable knife 16 which is slidably mounted in the plane of the mold bed surface 11d, and has an actuating fluid cylinder 16a. Here again, the knife 16 accomplishes the severing action while the partible mold sections 12a and 12b are still closed, and while the plastic article 1d is entirely confined and supported by such mold sections.

Still a further embodiment of this invention is illustrated in FIG. 9, wherein the severing is accomplished by a rotatable cutting disk 17, having its cutting edge disposed in the plane of the mold bed surface 11d, and having an eccentric shaft 17a projecting downwardly through a suitable hole in the mold bed 11, and having a crank portion 17b formed on the depending end of the shaft which is oscillated by a fluid cylinder 17c to effect the rotational cutting movement of the cutting disk 17, as indicated by the dotted lines in FIG. 9.

According to a still further embodiment of this invention, illustrated in FIG. 10, a rotatable cutting disk 18 is mounted for concentric rotation and has a peripheral cutting edge 18a adjacent to the aperture 11b in the mold bed 11 and lying in the plane of the bottom surfaces or faces 12e of mold sections 12a and 12b, or for convenience of reference in the plane of the top surface 11d of the mold bed 11. The severing action in the present instance is carried out by moving the closed mold sections 12a and 12b laterally relative to the bed plate 11 and to the rotatable cutting disk 18. Disk 18 may have an annular knife edge 18a, as shown, or may constitute a disk-type milling cutter. Rotation is imparted to the rotatable cutting disk 18 by a shaft 18f fixed to the center of the cutting disk 18 and extending downwardly therefrom through a suitable bore 11f in the mold bed 11 and having suitable driving connection with a motor 18b such as through conventional intergearing mechanisms as a beveled gear 18c mounted on shaft 18f mating with a complementary beveled gear 18d mounted on the drive shaft 18e of the motor 18b. Thus, in this instance the concentrically rotatable cutting disk 18 severs the surplus plastic 1a from the neck portion of the container in such manner to to form a smooth and even rim surface on the container neck.

Although it is contemplated that proper mating between the mold parts and the mold bed 11 will insure continued fluid pressure within the container during the cutting or severing of the surplus plastic, it may be preferable in certain instances to further provide means for insuring that the fluid pressure exerted upon the interior of the molded container is not interrupted by movement of the cutting devices or relative movement of the mold and bed plate during the severance of the surplus plastic. During the severance of the surplus plastic 1a from molded plastic within the closed mold sections 12a and 12b it is preferable to maintain fluid pressure on the interior of the molded and surplus plastic to counteract the tendency of the plastic to deform when an external cutting force is applied in the manner described above. In FIGS. 10–13, inclusive, the various forms of cutting elements previously described are illustrated in modified form and show means for accomplishing the maintenance of fluid pressure within the molded container and particularly in the internal areas of the plastic adjacent to the plane of severance of the surplus plastic. In FIG. 10 a plurality of marginally spaced apertures 18g are provided which extend transversely through the concentrically rotatable cutting disk 18. These apertures 18g are spaced radially from the axis of rotation of the disk 18 a distance sufficient that they will communicate with the hollow interior of the molded container as the latter is severed during its lateral movement against the peripheral cutting edge 18a of the disk 18. Immediately beneath the cutting disk 18 and defined in the mold bed 11, there is a recessed portion 11g communicating with each of the apertures 18g. Fluid pressure is supplied to said recessed portion 11g and said apertures through a passage 18h extending transversely through the mold bed 11 and connected to a suitable fluid pressure supply, as supply pipe 18j. Thus, fluid pressure passing through the apertures 18g acts as a counter force against the cutting force and pressure exerted against the plastic by the cutting disk 18 during the severing operation.

FIG. 11 shows the laterally shiftable knife 16 also provided with transverse apertures 16b to prevent obstruction of the fluid pressure as the knife passes through opposite walls of the tubular plastic. In this instance the apertures 16b are positioned to align with a hollow core of the tube when the knife 16 is passed through opposite walls of the tube to permit the fluid pressure from the blow head 14 to be maintained throughout the interior of the molded plastic container.

FIG. 12 illustrates the stationary cutting knife 15 provided with transverse inclined apertures 15a communicating through a transverse passage 15b in mold bed 11 with a fluid pressure supply conduit 15c positioned beneath the mold bed. The particular spacing and inclination of the apertures 15a is such that at least one of the apertures will be aligned with the passage 15b and the hollow interior of the molded plastic above the cutting knife 15 at all times when the hollow interior of the molded plastic is isolated from communication with the fluid pressure supplied by blow head 14, such isolation occurring as a result of lateral movement of the mold sections 12a and 12b relative to the blow head.

FIG. 13 represents a suitable arrangement of apertures 17d in the eccentric cutting disk 17. The apertures are positioned in an arcuate pattern and are aligned to register with the hollow core of the tubular plastic as the disk 17 is rotated. Here again the apertures accommodate passage of fluid pressure from the blow head 14 into the interior of the molded container during severance of the surplus plastic.

It will be apparent that irrespective of the type of cutting elements utilized, the severing of the excess plastic at the plane of the mold bed surface 11d, or, equivalently speaking, at the plane of the bottom face of the mold sections 12a and 12b, the end face of the resulting plastic article is completely finished by the cutting operation, and any and all molding seams on such end face are eliminated. While the top tail piece of plastic 1c can be similarly removed, this piece is readily torn off the finished container and the remaining ridge or flash of plastic, being on the bottom of the container, is not too detrimental.

Since the mold sections 12a and 12b were originally closed around the plastic tubular formation 1 without producing any forcible engagement of the molding surfaces with the tubing 1, no molding seams or flash of any substantial size will appear on the finished plastic article along the sides of the article, such as along the thread portions of the bottle cavity 12. Furthermore, all portions of the finished plastic article will have been blown from plastic tubing which has not been subjected to any extraneous chilling influences or contacts, since the only portion of the plastic tube which has had any opportunity for a chilling contact is that portion 1a which entered the mold bed aperture 11b and which has been completely severed from the remainder of the plastic article by the aforedescribed severing step.

Upon completion of the severing step, and any further cooling of the formed article 1d that may be required to cool it to a self-supporting temperature, the partible mold sections 12a and 12b are then moved apart by their respective fluid cylinders to release the formed plastic article, which may be bodily ejected from the machine by a laterally directed air blast. Concurrently, the blow head 14 is elevated relative to the mold bed aperture 11b to eject from the aperture the surplus plastic end 1a which was left in such aperture by the severing operation. This surplus plastic may also be bodily ejected from the machine by a laterally directed air blast. As previously mentioned, additional cooling of the metal surfaces contacting the surplus plastic tubing in the mold bed aperture 11b may be effected by providing coolant passages (not shown) in the blow head 14 and/or the mold bed 11 through which suitable coolant may be circulated to reduce any possible tendency of the surplus plastic 1a to adhere to the walls of the aperture 11b and interfere with its subsequent ejection therefrom.

The mold bed 11 and the partible mold sections 12a and 12b are then actuated by their respective fluid cylinders to return to their initial positions in the cycle, as illustrated in FIG. 1. Since the extruder 10 has been continuously extruding a new length of plastic tubing 1, the machine is immediately ready to initiate the next cycle of operations to produce the next subsequent plastic article.

Two additional refinements to the machine for facilitating its adaptation to a wide range of sizes of plastic articles produced are shown in FIG. 7. Since the mold bed aperture 11b must vary in size to some degree in accordance with the diameter of the plastic tubing being extruded, the mold bed aperture 11b may be more conveniently formed by utilizing an annular plug 11e, which is inserted in the mold bed 11, and has a central bore which defines the mold bed aperture 11b. In this manner, to adapt the mold bed to different sizes of tubing, it is only necessary to substitute a different plug 11e having the desired bore size for the mold bed aperture 11b.

In some cases, the severing of the excess plastic tube end 1a from the formed plastic article may be expedited by producing a relatively thin web of plastic at the desired plane of severing. This may be conveniently accomplished by proportioning the mold bed aperture 11b to be substantially greater than the neck opening of the molding cavity 12. Hence, when the blowing pressure is applied to the plastic tubular formation, it will expand and be drawn out around the right angle corner defined at the end surface of the neck cavity 12f and produce a thinning of the plastic at this point, indicated at 1e, which will facilitate the subsequent severing of the excess plastic end 1a from the formed plastic article.

From the foregoing description, it will be clearly apparent to those skilled in the art that the described process and apparatus produces hollow plastic articles, and particularly, containers such as bottles, with greater efficiency, quality and uniformity than has heretofore been possible. The automatic trimming and flash-free finishing of the container end surface provide an advantage that heretofore has been unrealized in the art, since articles produced by conventional extrusion and blowing practices have required the trimming and finishing of the end surface to be accomplished by a separate operation, independent of the blowing machine. Furthermore, the complete formation of the plastic article by blowing of tubing which has not been subjected to any extraneous chilling influences, assures that the finished article will have a most uniform wall thickness distribution in all horizontal planes throughout the entire height of the plastic article.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. Apparatus for forming hollow plastic articles comprising means for downwardly extruding a freely pendant open-end tubular formation of thermoplastic material at a temperature permitting expansion and setting in a mold, a horizontal mold bed mounted beneath said extruder means and having a vertical aperture to freely receive said open end of said tubular formation, a plurality of partible mold sections slidably mounted relative to said mold bed, means for closing said mold sections around said tubular formation after said open end enters said aperture, means for supplying fluid pressure through said open end of the tubular formation to expand said tubular formation within said closed partible mold, a cutting element disposed adjacent said aperture and lying in the plane of the bottom face of said partible mold, and means for relatively horizontally moving the closed partible mold and said cutting element to sever the plastic projecting below said partible mold.

2. The combination defined in claim 1, wherein the bottom opening defined by said closed partible mold is of substantially smaller diameter than said vertical aperture and has a substantially right angle corner, whereby the plastic tubular formation is expanded by fluid pressure to form a thin web at said right angle corner which is severed by said cutting element.

3. The process of forming hollow plastic articles comprising extruding a tubular formation of thermoplastic material at a temperature permitting expansion and setting in a mold, causing the leading end of the tubular formation to freely enter into an aperture in a mold bed, shifting partible mold sections relative to one another to a closed position surrounding said tubular formation and contiguous to said mold bed, applying fluid pressure through said leading end to expand said tubular formation to the configuration of said mold, jointly laterally shifting the mold sections on the mold bed to sever that portion of the plastic tubular formation projecting into said aperture from the portion in the mold while said partible mold is closed and during the application of said fluid pressure, and opening said partible mold to release the formed article.

4. The process of forming hollow plastic articles comprising extruding a tubular formation of thermoplastic material at a temperature permitting expansion and setting in a mold, causing the leading end of the tubular formation to enter into an aperture in a mold bed, shifting partible mold sections to a closed position surrounding said tubular formation and contiguous to said mold bed, applying fluid pressure through said leading end to expand said tubular formation to the configuration of said mold, relatively moving said closed partible mold across a cutting element disposed in the plane of said mold bed to sever that portion of said plastic tubular formation projecting into said aperture, and then opening said partible mold to release the formed article.

5. The process of forming hollow plastic articles comprising extruding an open-end tubular formation of thermoplastic material at a temperature permitting expansion and setting in a mold, causing said open end of the tubular formation to enter into an aperture in a mold bed, sliding partible mold sections on said bed to a closed position surrounding said tubular formation and supported upon said mold bed, relatively moving a blow head in said aperture to engage said open end of the tubular formation and effect a seal therewith, applying fluid pressure through said blow head to expand said tubular formation to the configuration of said mold, relatively moving the closed partible mold across a cutting element disposed in the plane of said mold bed to sever that portion of the tubular formation projecting into said aperture, opening the partible mold to release the formed article, and then axially shifting said blow head in said aperture to eject the severed end of the plastic tubular formation from said aperture.

6. The process of forming a hollow plastic container having a neck opening comprising producing an open end vertical tubular formation of thermoplastic material at a temperature permitting expansion and setting in a mold, causing said open end of the tubular formation to freely enter into a vertical aperture in a mold bed, shifting partible mold sections relative to said bed to a closed position surrounding said tubular formation and resting upon said mold bed, said mold sections when closed defining an inverted container cavity with the end surface of the neck portion flush with said mold bed, inserting a blow head in said aperture to engage said open end of the tubular formation and to clamp said open end to said mold bed, applying fluid pressure through said open end to expand said tubular formation to conform to said mold cavity, laterally shifting the mold and the expanded formation enclosed therein on said mold bed to sever therefrom that portion of the tubular formation clamped to the mold bed by the blow head, thereby producing a finished end surface on the container neck, and opening said partible mold to release the formed container.

7. The process of forming a hollow plastic container having a neck opening comprising producing a vertical tubular formation of thermoplastic material at a temperature permitting expansion and setting in a mold, causing the leading end of the tubular formation to enter into a vertical aperture in a mold bed, shifting partible mold sections along said bed to a closed position surrounding said tubular formation, said mold sections when closed defining an inverted container cavity with the end surface of the neck portion flush with said mold bed, applying fluid pressure through said leading end of the tubular formation to expand said tubular formation to conform to said mold cavity, relatively horizontally moving said partible mold while closed across a horizontal cutting element disposed in the plane of said mold bed to sever that portion of the tubular formation projecting downwardly from said closed partible mold, thereby producing a finished end surface on the container neck, and opening said partible mold to release the formed container.

8. The process of forming a hollow plastic container having a neck opening comprising producing an open-end vertical tubular formation of thermoplastic material at a temperature permitting expansion and setting in a mold, causing said open end of the tubular formation to freely enter into a vertical aperture in a mold bed, shifting partible mold sections to a closed position surrounding said tubular formation and supported on said mold bed, said mold sections when closed defining an inverted container cavity with the end surface of the neck portion flush with said mold bed, inserting a blow head in said aperture to engage said open end of the tubular formation, applying fluid pressure through said open end to expand said tubular formation to conform to said mold cavity, concurrently (1) laterally shifting on said mold bed the closed mold and the expanded formation therein and (2) severing in the plane of the mold bed that portion of the tubular formation entered in said aperture, thereby producing a finished end surface on the container neck, opening the mold sections to release the finished article and raising said blow head in said vertical aperture to eject the severed end of the tubular formation from said aperture.

9. Apparatus for forming hollow plastic articles comprising means for downwardly extruding a freely pendant open-end tubular formation of thermoplastic material at a temperature permitting expansion and setting in a mold, a horizontal mold bed mounted beneath said extruder means and having a vertical aperture to freely receive said open end of said tubular formation, a plurality of partible mold sections slidably mounted relative to said mold bed, means for closing said mold sections around said tubular formation after said open end enters said aperture, means for supplying fluid pressure through said open end of the tubular formation to expand said tubular formation within said closed partible mold, a cutting element disposed adjacent said aperture and lying in the plane of the bottom face of said partible mold, means for relatively moving the closed partible mold and said cutting element to sever the plastic projecting below said partible mold, and means defining at least one fluid pressure passage traversing said cutting element and arranged to register with the hollow interior of the expanded plastic during the relative movement of said cutting element and said partible mold.

10. The process of forming hollow plastic articles comprising extruding a tubular formation of thermoplastic material at a temperature permitting expansion and setting in a mold, causing the leading end of the tubular formation to freely enter into an aperture in a mold bed, shifting partible mold sections to a closed position surrounding said tubular formation and contiguous to said mold bed, inserting a blow head into only that portion of the leading end of said tubular formation projecting into said aperture, applying fluid pressure through said blow head to expand the mold-enclosed portion of the tubular formation and to cool the leading end thereof exteriorly of the mold, severing the cooled leading end from the expanded mold-enclosed portion of said formation while said partible mold is closed by the passage of a severing knife intermediate the inserted blow head and the mold, introducing fluid pressure into the hollow interior of the expanded plastic during severance of said projecting plastic tubular formation, and opening said partible mold to release the formed article.

11. The process of forming hollow plastic articles comprising extruding a tubular formation of thermoplastic material at a temperature permitting expansion and setting in a mold, causing the leading end of the tubular formation to freely enter into an aperture in a mold bed, shifting partible mold sections to a closed position surrounding said tubular formation and contiguous to said mold bed, inserting a blow head into only that portion of the formation in said aperture, applying fluid pressure through said blow head and said leading end to expand said tubular formation to the configuration of said mold and to chill that portion of the leading end of the formation immediately exterior to the mold, relatively moving the mold and a severing element disposed in a plane intermediate the mold and the blow head to sever the chilled portion of the leading end of said tubular formation projecting into said aperture from that portion in the mold while said mold is closed and while maintaining fluid pressure within the hollow interior of the expanded plastic, and opening said partible mold to release the formed article.

12. The method of forming and trimming hollow plastic articles having an open neck portion comprising forming a tubular formation of heat-softened thermoplastic material, enclosing said tubular formation within a partible mold having a neck defining portion and a tube pinching portion spaced from said neck defining portion, so that one end of said tubular formation is pinched and sealed by said tube pinching portion and the other end of said tubular formation projects beyond said neck defining portion, applying fluid pressure to the interior of said tubular formation to expand same to conform to said partible mold, moving said partible mold while closed over a severing element disposed in the plane of the end of the neck portion, thereby trimming the neck end of the plastic article, and then opening said partible mold to remove the trimmed plastic article therefrom.

13. The method of forming and trimming a blown thermoplastic article comprising relatively laterally moving the segments of a mold to enclose a portion of an extruded tube of heated thermoplastic material, blowing the mold-enclosed tube portion to the configuration of the article by introducing blow air through a portion of the tube which projects out of the mold, jointly laterally displacing the mold segments and the mold enclosed tube portion relative to the projecting portion of the tube to sever said projecting portion from said mold enclosed material while maintaining fluid pressure within the blown article confined in said mold, and relatively laterally moving said segments to open the mold, thereby releasing the blown and trimmed article.

14. The process of forming and trimming hollow plastic articles comprising forming a tubular formation of heated thermoplastic material, enclosing a portion of said tubular formation in a hollow partible mold, applying fluid pressure through a blow head and through a portion of the formation intermediate the mold and the blow head to expand said mold enclosed portion of said tubular formation to the interior configuration of said partible mold, severing that portion of said tubular formation enclosed in said partible mold from that portion not enclosed while said partible mold is closed and during the continued application of fluid pressure, and then opening said partible mold to remove the expanded and trimmed plastic article therefrom.

15. The method of forming and trimming hollow plastic articles having an open neck portion comprising forming a tubular formation of heat-softened thermoplastic material, enclosing said tubular formation within a partible mold having a neck defining portion and a tube pinching portion spaced from said neck defining portion, so that one end of said tubular formation is pinched and sealed by said tube pinching portion and the other end of said tubular formation projects beyond said neck defining portion, applying fluid pressure to the interior of said tubular formation to expand the mold-enclosed portion thereof to conform to said partible mold and also to expand said other end thereof, severing the expanded plastic in the plane of the end of the neck portion, terminating the fluid pressure, then opening said partible mold to release the expanded and trimmed plastic article therefrom.

16. In a process of forming and trimming hollow plastic articles from a tubular formation of heated thermoplastic material by enclosing a portion of said tubular formation in a hollow partible mold, a waste portion of the formation projecting beyond the mould, contacting the waste portion exteriorly of the mold with a blow head and applying fluid pressure through the blow head and through the waste portion to expand said mold enclosed portion of tubular formation to the interior configuration of said partible mold, characterized by the steps of severing intermediate the article and the blow head that portion of said tubular formation enclosed in said partible mold and defining the article from the waste portion of the tube while said partible mold is closed, and subsequently opening said partible mold to accommodate the removal of the expanded and trimmed plastic article therefrom.

References Cited in the file of this patent

UNITED STATES PATENTS

| | | |
|---|---|---|
| 2,290,129 | Moreland et al. | July 14, 1942 |
| 2,783,503 | Sherman | Mar. 5, 1957 |
| 2,787,023 | Hagen et al. | Apr. 2, 1957 |
| 2,810,934 | Bailey | Oct. 29, 1957 |
| 2,928,120 | Leghorn et al. | Mar. 15, 1960 |
| 2,930,079 | Parfrey | Mar. 29, 1960 |

FOREIGN PATENTS

| | | |
|---|---|---|
| 163,661 | Australia | June 28, 1955 |
| 1,029,586 | France | Mar. 11, 1953 |
| 1,105,529 | France | July 6, 1955 |
| 744,927 | Great Britain | Feb. 15, 1956 |